United States Patent Office 3,073,676
Patented Jan. 15, 1963

3,073,676
PROCESS OF RECOVERING FLUORINE FROM SOLID RESIDUES BY PYROHYDROLYSIS
Paul Mollard and Gilbert Turpin, Sainte-Foy-les-Lyon, France, assignors to Societe d'Electro-Chimie d'Electro-Metallurgie et des Acieries Electriques d'Ugine, Paris, France, a corporation of France
No Drawing. Filed July 25, 1961, Ser. No. 126,514
Claims priority, application France July 29, 1960
4 Claims. (Cl. 23—153)

It is known that the manufacture of aluminum by igneous electrolysis of fluoride baths containing alumina in solution is accompanied at the anode by a release of gases mainly composed of carbonic gas, carbon oxide and fluoride gases. The composition of the fluoride gases varies according to the nature of the utilized anodes; in the case of Söderberg anodes with vertical current lead-ins, the hydrofluoric acid content is relatively high.

For health and safety reasons it is not possible to allow these gases to escape freely into the atmosphere. They are burned at the outlet of the electrolysis cells with a great excess of air. The burned gases contain in suspension very fine dusts essentially composed of carbon and fluorine compounds; an important amount of tar is also carried along therewith.

Before being washed to recover the gaseous hydrofluoric acid, the gases are freed from dust, for example by means of electrostatic precipitators; very fine soots rich in fluorine are collected. The fluorine contained in these soots represents about 20% of the total fluorine losses occurring in the course of the alumina electrolysis. It is thus important that this fluorine be recovered. Various processes have been proposed to this end, but they present difficulties of accomplishment on an industrial scale.

It is also desirable to extract the fluorine contained in the cathodic residues and the residues obtained by scraping the cells.

The applicants have perfected a simple process enabling one to recover in a single operation the fluorine from these various solid residues in the form of easily soluble hydrofluoric acid.

Numerous published works have pointed out the possibility, in a method for the quantitative analysis of fluorine in fluorine compounds, of effecting a liberation of gaseous hydrofluoric acid by pyrohydrolysis of fluorine compounds. This pyrohydrolysis is carried out in the absence of air and in the presence of a very great excess of steam. The fluorine extraction yield, which must be as near 100% as possible, is reached with temperatures variable according to the nature of the fluorine compound to be analyzed. This temperature must be at least equal to 1000° C., but it is necessary to reach 1200° C. if it is desired to analyze correctly all the fluorine compounds (except $CaF_2$), and it is necessary to utilize a very high amount of steam, ranging from about 300 to 400 grams per gram of fluorine. Such requirements involve expenses bearable in a process of analyzing for fluorine but which are too costly in comparison with the value of the fluorine to be recovered to be used industrially in process for recovering fluorine.

The present invention relates to a process for recovering fluorine in the form of hydrofluoric acid from the above-indicated solid residues, which consists essentially in carrying out their pyrohydrolysis at a temperature included between about 600 and 1100° C. in the presence of steam and of a diluting gas devoid of effect on the liberated hydrofluoric acid.

The dilution of steam by this gas displaces the equilibrium of the pyrohydrolysis reaction in the direction of liberation of gaseous hydrofluoric acid; for the same yield of fluorine, it enables the pyrohydrolysis to be carried out at a lower temperature and the steam consumption to be lowered.

As diluting gas, air, oxygen, nitrogen, etc., for example, may be employed. Air is, however, the most economical gas; in addition, it permits the combustion of the carbon generally contained in the residues to be treated; this carbon may be in sufficient amount that its combustion enables the favorable temperature of the pyrohydrolysis to be reached. If such is not the case, a combustible element may be added; if this latter is a hydrocarbonated derivative, its combustion provides also an addition of steam. By a suitable mixing of various available solid residues it is possible to utilize the carbon present in some of them as combustible, permitting one to obtain the temperature required for the pyrohydrolysis of another compound, which, when considered separately, contains only an amount of carbon insufficient to reach this temperature.

The process according to the invention can be utilized: either on gases coming out of the electrolysis cells, in burners located at the outlet of the cells or in other apparatus, or on the soots separted from these gases, or on the scraping residues of the cells, or on the cathodic residues, or on the mixtures of these various products.

In any case, it is desirable to work on a finely divided material.

The yield of fluorine recovery by the process of the invention depends on:

(a) *The pyrohydrolysis temperature.*—A series of tests carried out by the applicants, each on a portion of a quantity of solid residues by treatment with a gaseous mixture containing 75% steam and 25% air for two hours, has shown that the yield of fluorine recovery increases linearly with the temperature and increases from 36% for a temperature of 600° C. to 95% for a temperature of 1000° C.; in all the tests of this series the mixture of steam and air was admitted to the charge as soon as the temperature of the charge reached 500 to 600° C. and the input of the gaseous mixture was the same.

(b) *The proportion of steam in the steam-diluting gas mixture.*—Another series of tests, each also of two hours, has shown that the yield of fluorine recovery increases linearly with the proportion of steam in the gas-steam mixture; for a test temperature of 750° C., this yield is about 30% if the gaseous mixture contains only traces of steam and goes up to 62% if this mixture contains 75% steam.

(c) *The duration of the treatment.*—Another series of tests, carried out with a gaseous mixture containing 75% steam at the temperature of 1000° C., has shown that the yield of fluorine recovery reaches 95% if the reaction time is about one hour and that it decreases to 70% if the admission of the gas-steam mixture is stopped as soon as the charge temperature reaches 1000° C., i.e. if the reaction time at 1000° C. is only a few minutes.

The process of the invention presents an economic interest, in view of the cost of steam, particularly if an amount of steam smaller than 40 or 60 kg. is utilized for one kg. of recovered fluorine. For carrying out this process, conditions will be chosen—temperature, steam proportion, treatment duration—in view of the local economic data. For example, the applicants' tests have shown that, under the available conditions, the best efficiency of the process corresponds to a yield of fluorine recovery of 60 to 70% obtained with a treatment of about one hour at about 1000° C. by an air-steam mixture containing 25% steam and 75% air, leading to a consumption of about 25 kg. of steam per kilo of recovered fluorine.

Example 1

The process of the invention was applied to a batch of soots obtained by subjecting to electrostatic precipitation the gases coming from aluminum production cells and having the following analysis:

| | Percent |
|---|---|
| Total fluorine | 19 |
| Total iron | 1.75 |
| Total sulphur | 2.85 |
| Tars | 48 |
| Carbon | 4.2 |

Fluorine was there essentially in the form of aluminum fluoride and cryolite with a little ferric cryolite and spar.

100 kg. of soots, previously formed into balls, were charged on the grate of a vertical tube furnace traversed by an upward air current fed at a constant rate of 500 m.$^3$/h. (calculated at 0° C. and 760 mm. of Hg). When the charge temperature had reached 500 to 600° C., steam was fed into the air current, at the rate of 1500 m.$^3$/h. (calculated at 0° C. and 760 mm. of Hg.) which corresponded to a proportion of 75% steam in the gases passing through the charge. When the temperature had reached 1000° C., it was maintained there, as was also the admission of steam, for one hour. During the whole operation the gases such as HF, $SO_2$, coming out of the pyrohydrolysis furnace, were condensed.

There was then collected a dilute solution of hydrofluoric acid containing 8 g./l. of HF. The yield of fluorine recovery was 92%. The pyrohydrolysis residue contained no more than 4% fluorine. 130 kg. of water were consumed per kilo of recovered fluorine.

Example 2

The process of the invention was applied to a 100 kg. batch of the same soots as in the preceding example. But the amount of steam in the air current fed at the same rate of 500 m.$^3$/h., was reduced to 165 m.$^3$/h. (calculated at 0° C. and 760 mm. of Hg), which corresponded to a proportion of 25% of steam in the gases passing through the charge. As in Example 1, the temperature of 1000° C. was maintained for one hour with this proportion of 25% steam in the gases.

Under these conditions there was collected a dilute solution of hydrofluoric acid containing 30 g./l. of HF with a fluorine recovery yield of 70% and a water consumption of only 23 kg. per kilo of recovered fluorine.

We claim:

1. The process of recovering fluorine in the form of hydrofluoric acid from solid residues resulting from the electrolytic production of aluminum, which comprises heating said residues to a temperature of about 600 to 1100° C. and flowing therethrough a mixture of steam and a diluting gas devoid of effect on the liberated hydrofluoric acid, the amount of steam used being less than 60 kg. per kg. of fluorine recovered, said mixture being about 25 to 75% of steam and about 75 to 25% of diluting gas.

2. The process of recovering fluorine in the form of hydrofluoric acid from solid residues resulting from the electrolytic production of aluminum, which comprises heating said residues to a temperature of about 600 to 1100° C. and flowing therethrough a mixture of steam and diluting gas, said mixture being about 25 to 75% of steam and about 75 to 25% of diluting gas, said diluting gas being selected from the group consisting of air, oxygen and nitrogen.

3. The process of recovering fluorine in the form of hydrofluoric acid from solid residues resulting from the electrolytic production of aluminum, which comprises heating said residues to a temperature of about 600 to 1100° C. and flowing therethrough a mixture of steam and air containing, by volume, about 25 to 75% of steam and about 75 to 25% of air.

4. The process of recovering fluorine in the form of hydrofluoric acid from solid residues resulting from the electrolytic production of aluminum, which comprises heating said residues to a temperature of about 1000° C., flowing therethrough a mixture of steam and air containing, by volume, about 25% steam and 75% air, and maintaining the specified conditions for a period of about one hour.

References Cited in the file of this patent

UNITED STATES PATENTS

| | | |
|---|---|---|
| 167,986 | Burgess | Sept. 21, 1875 |
| 660,094 | Doremus | Oct. 23, 1900 |
| 1,871,723 | Morrow | Aug. 16, 1932 |
| 2,858,198 | McGreer et al. | Oct. 28, 1958 |
| 2,991,159 | Wendt | July 4, 1961 |

OTHER REFERENCES

Mellor: "Comprehensive Treatise on Inorganic and Theoretical Chemistry," vol. 2, 1922 Ed., page 127. Longmanns, Green & Co., N.Y.